J. HAMPSON.
APPARATUS FOR SEPARATING DUST, DIRT, LEAVES, AND OTHER IMPURITIES FROM WOOL, HAIR, COTTON, AND OTHER FIBROUS MATERIALS.
APPLICATION FILED MAR. 5, 1910.
989,545.
Patented Apr. 11, 1911.
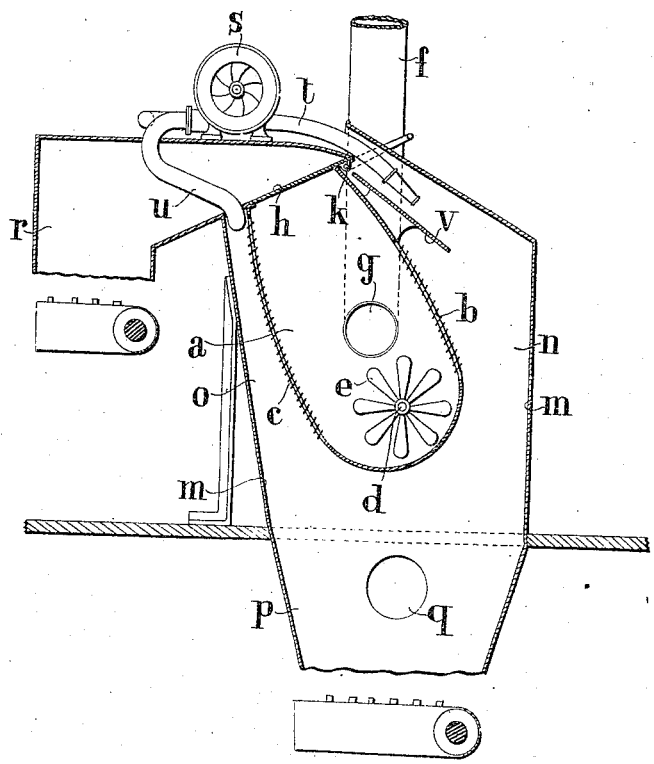

UNITED STATES PATENT OFFICE.

JOHN HAMPSON, OF CHILWORTH, ENGLAND, ASSIGNOR TO WOLCOT COMPANY, LIMITED, OF LONDON, ENGLAND.

APPARATUS FOR SEPARATING DUST, DIRT, LEAVES, AND OTHER IMPURITIES FROM WOOL, HAIR, COTTON, AND OTHER FIBROUS MATERIALS.

989,545.     Specification of Letters Patent.     Patented Apr. 11, 1911.

Application filed March 5, 1910. Serial No. 547,598.

*To all whom it may concern:*

Be it known that I, JOHN HAMPSON, a subject of the King of England, residing at Tangley Mere, Chilworth, in the county of Surrey, England, have invented certain new and useful Improvements in Apparatus for Separating Dust, Dirt, Leaves, and other Impurities from Wool, Hair, Cotton, and other Fibrous Materials; and I do hereby declare the following to be a full, clear, and exact description of the invention, such as will enable others skilled in the art to which it appertains to make and use the same.

This invention relates to an improved apparatus for separating dust, dirt, leaves and other impurities from all kinds of fibrous materials, such for example as wool, hair, cotton and the like.

The machine is of the type wherein a chamber is provided, one or more of the walls of which are composed of grids, sieves or the like, such chamber having, preferably at the lower part thereof, a shaft or shafts provided with fans or beaters, suitable inlet and outlet orifices being provided for feeding in the untreated fibrous materials, for withdrawing or expelling the treated product and for removing the impurities which have been expelled from the material.

I have found in practical working machines of the aforesaid description that various difficulties are experienced, for instance, the dust and impurities of some of the materials are not drawn away sufficiently quickly after being expelled by the beating and blowing to which they are subjected by the rotary beaters.

My present invention relates to an improved form of such machines, wherein improved means are provided for removing the dirt or dust expelled from the fiber, thus causing a more rapid and efficient treatment of the material.

My apparatus consists broadly of a chamber provided with grids or sieves having a shaft furnished with beaters mounted preferably horizontally near the bottom thereof, an inlet aperture opening into the interior of the said chamber, and an outlet aperture closed by a suitable door or the like. This chamber is mounted in another outer chamber formed with unperforated sides and coming at some little distance from the outside of the first mentioned chamber, so that there is a space formed between the perforated or grid-like walls of the first chamber and those of the outer chamber. Into the space or spaces thus formed nozzles are led, which may be connected with rotary fans or other suitable means for producing a strong current, say, of air, which current of air, for instance, when the apparatus is in use passes down between the grid-like walls of the inner chamber and the solid walls of the outer chamber. Below the inner chamber is a receptacle for the dust and other material expelled. Means are provided for expelling the treated product, for carrying away the dust and refuse ejected from the machine and for carrying away any half treated material which may escape through the grid, to further apparatus for more fully treating the same.

I will now proceed to describe by way of example one particular form of machine embodying the principles of my invention.

In this case the inner chamber is formed somewhat elliptical in shape in cross section and has extending along each wall a sieve or grid. At the bottom of the elliptical chamber is mounted a horizontal shaft provided with a number of beaters or fans and entering the chamber at some little distance above the beater or fan is an entry pipe leading to a suitable hopper or the like for feeding the machine. The elliptical chamber has at the top a suitably hinged flap. The elliptical chamber $a$ is closed by sheet metal or the like coming at some distance from the grid, in such a way that two spaces are formed one on each side of the chamber. The outer chamber thus formed is prolonged downward into a lower chamber from which opens an outlet passage and such chamber has at the bottom a conveyer for the purposes hereinafter explained. Opening into such space formed between the perforated walls of the inner chamber and the walls of the outer chamber, is a nozzle or there may be more than one communicating with a blower.

In a companion case filed May 6, 1910, No. 559,806, in addition to the structure herein shown I have illustrated and described certain coöperating arrangements, but in order that the present broader invention may be better understood I will now proceed to describe the same with reference to the drawing accompanying this specification, in which—

*a* is the inner chamber which is made somewhat elliptical in cross section.

*b* and *c* are grids and form two walls of the chamber *a*.

*d* is a shaft which has mounted thereon a number of beaters or fans *e*.

The chamber *a* is elliptical in its general outline and its lower part, beneath the beaters *e*, is imperforate.

*f* is a tube leading from a supply hopper to the aperture *g* in the chamber *a*, which aperture is some little distance above the beaters or fans *e*.

*h* is a flap hinged at *k* and arranged at the top of the chamber *a* so as to close such chamber when required.

Surrounding the chamber *a* is a casing *m*, which forms two spaces *n* and *o* one on each side of the chamber. The inclosed spaces *n* and *o* are in communication with the chamber *a* through the grids *b* and *c*. The casing *m* continues downward and forms a lower chamber *p*, which has working at the bottom a conveyer of suitable construction.

*q* is an outlet passage from the chamber *p*.

When the flap *h* is opened, the chamber *a* communicates with a passage *r* which leads to a suitable conveyer.

*s* is an air fan, from which pipes *t* and *u* ending in nozzles communicate with the spaces *n* and *e*, there being two pipes *u* one at each side of the space *o* and one pipe *t*. The space *n* has fitted therein a deflector plate *v*.

The action is as follows:—The material to be treated is fed down the pipe *f* into the chamber *a*, the beaters or fans *e* are set working and beat and blow the material, throwing it against the grid surface *b*, whence it passes along the top to the grid surface *c*. While this is taking place the air fan *s* is blowing air through the pipes *t* and *u*, down the spaces *n* and *o*, so that all the dirt and refuse passing the grids is driven into the lower chamber *p*. The foggy floating portion of this dust is drawn off through the opening *q* and passes to an ordinary cyclone separator, the remainder going to the bottom of the chamber from where it is carried by a perforated conveyer which again separates the dirt from any fiber which may have passed through the grids with it. After the material in the chamber *a* has been thoroughly treated the flap *h* is opened by any suitable means and the material which has been treated is driven (by the continued rotation of the beaters or fans *e*) into the passage *r*, from whence it is carried away by a suitable conveyer ready for use.

I may vary the constructional features of my invention to suit requirements without departing from the principle of the same and I may combine, if found desirable, one or more chambers of the class described in series in order to form a plant, varying the arrangement to suit requirements.

What I claim and desire to secure by Letters Patent of the United States of America is:—

1. In an apparatus of the character described, the combination of an elliptical chamber having grid-like walls, one end thereof being provided with an opening, a pivoted flap adapted to close said opening, a beater therein, a casing surrounding said chamber, and pipes attached to the upper part of said casing through which jets of air may be introduced into said casing around said walls, substantially as described.

2. In an apparatus of the character described, the combination of an elliptically-shaped chamber, the bottom thereof being imperforate and the other end being provided with an opening and having grid-like walls, a pivoted flap adapted to close said opening, a beater in said chamber, a casing surrounding said chamber, pipes entering said casing at its upper end, and a fan connected to said pipes, whereby jets of air may be forced into said casing around said chamber, substantially as described.

3. In a device of the character described, the combination of an outer casing provided with an opening near its top, an opening near its bottom, and an exhaust opening for the dust, an elliptically shaped chamber in the upper part of said casing and located a considerable distance above said exhaust opening, said chamber having an imperforate lower end and grid-like walls and at its upper end provided with an opening, a pivoted flap adapted to close the opening in said chamber, beaters in said chamber, a pipe adapted to deliver the material under treatment into said chamber, a fan, and pipes leading from said fan into the upper part of said casing, said casing being provided with partitions in proximity to the end of said pipes to direct the jets of air entering through said pipes downwardly around said chamber, substantially as described.

In testimony whereof, I affix my signature, in presence of two witnesses.

JOHN HAMPSON.

Witnesses:
H. W. W. BEAN,
A. E. VIDAL.

---

Copies of this patent may be obtained for five cents each, by addressing the "Commissioner of Patents, Washington, D. C."